Figure 1:
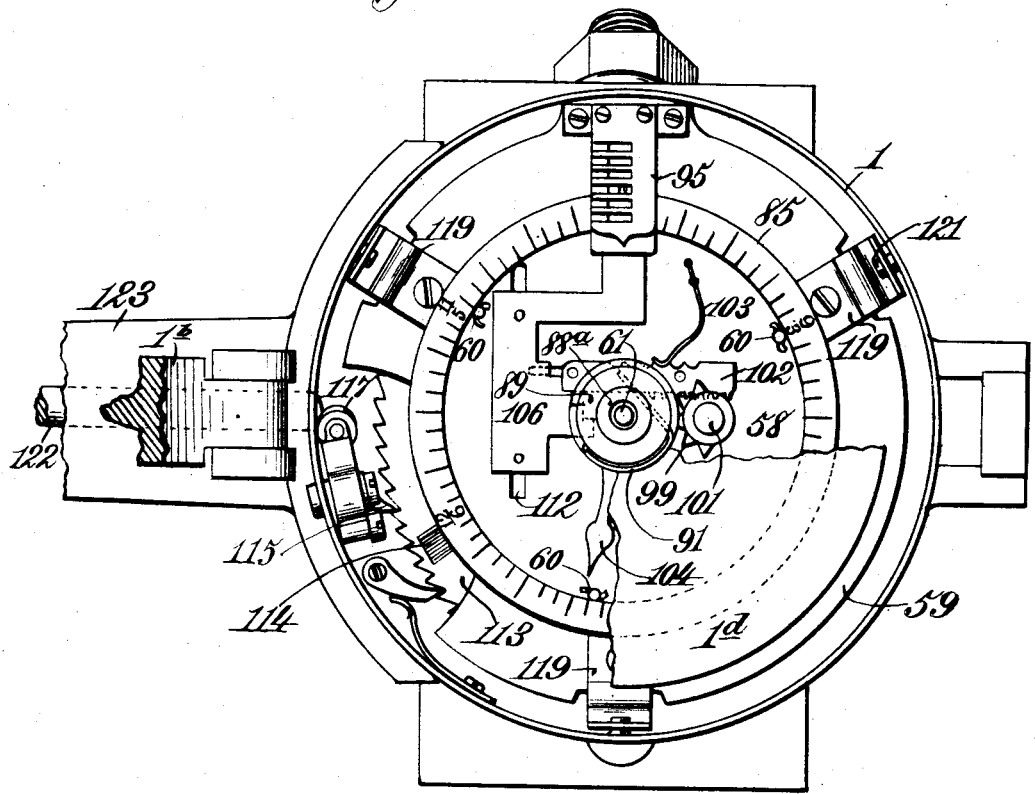

No. 872,186. PATENTED NOV. 26, 1907.
C. H. D'LA MONTE.
SPEED RECORDING INSTRUMENT.
APPLICATION FILED MAR. 21, 1906.

3 SHEETS—SHEET 1.

Witnesses.
Robert Emett
L. B. Keefe

Inventor:
Cascious H. d'La Monte.
By James L. Norris.
Att'y.

No. 872,186.
PATENTED NOV. 26, 1907.
C. H. D'LA MONTE.
SPEED RECORDING INSTRUMENT.
APPLICATION FILED MAR. 21, 1906.
3 SHEETS—SHEET 2.
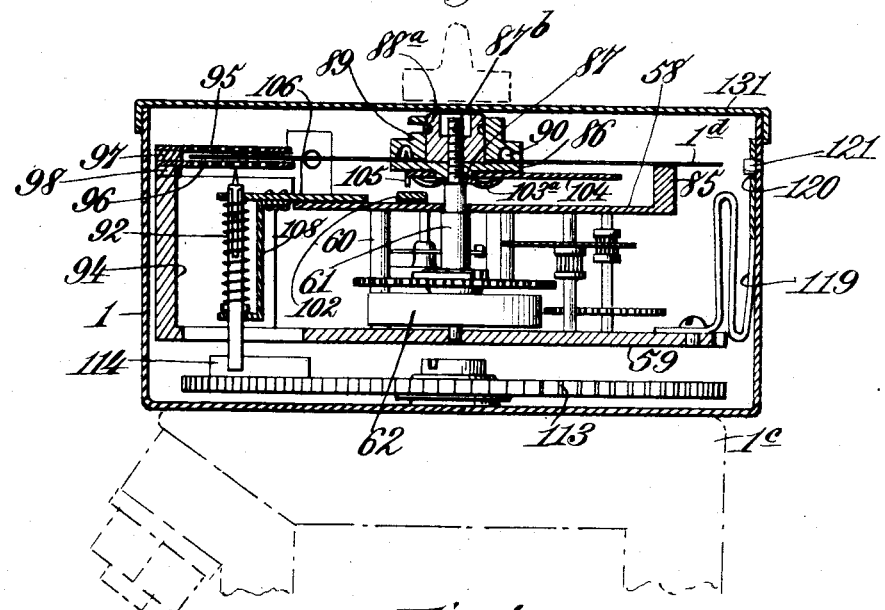
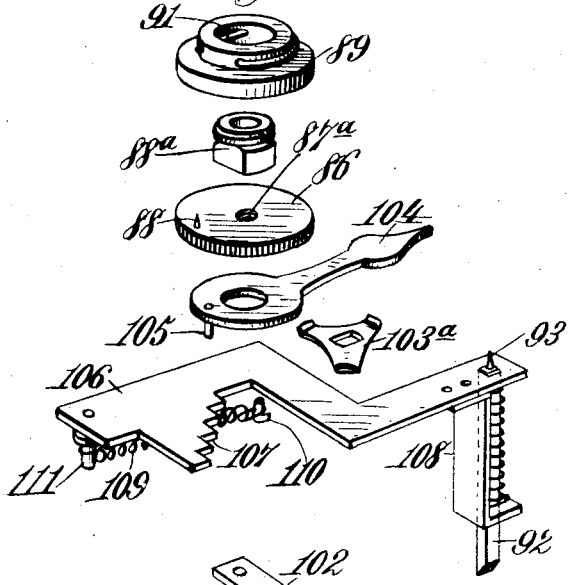
Witnesses.
Robert Everett,
F. B. Keefe
Inventor.
Cascious H. d'La Monte.
By James W. Norris.
Att'y.

No. 872,186. PATENTED NOV. 26, 1907.
C. H. D'LA MONTE.
SPEED RECORDING INSTRUMENT.
APPLICATION FILED MAR. 21, 1906.
3 SHEETS—SHEET 3.
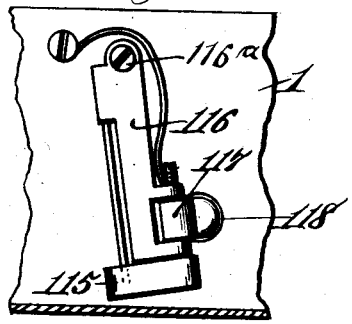
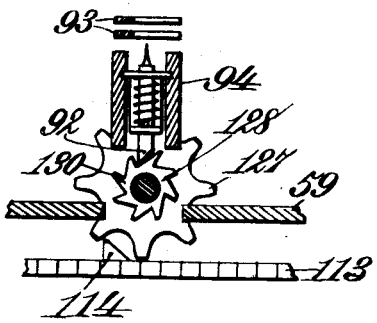
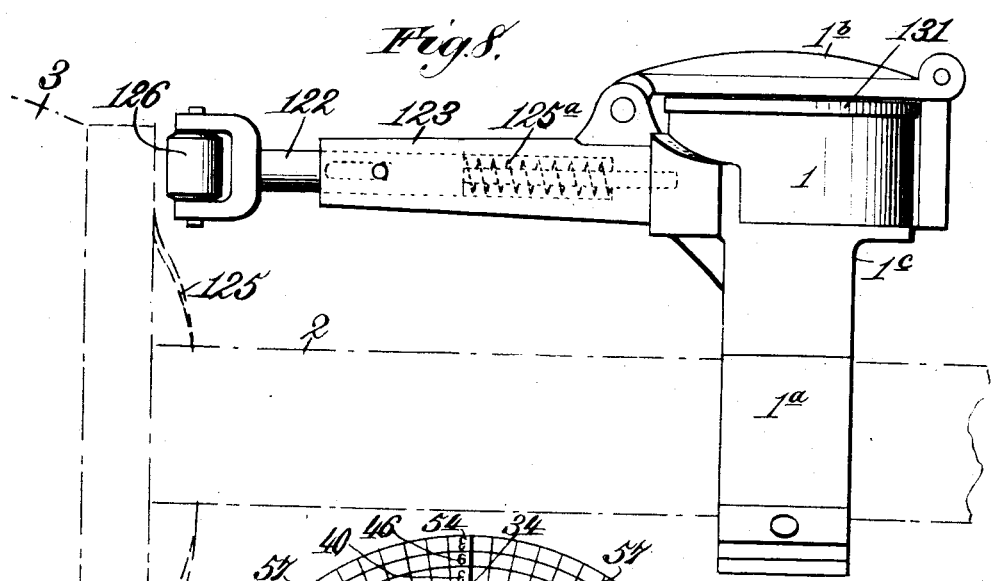
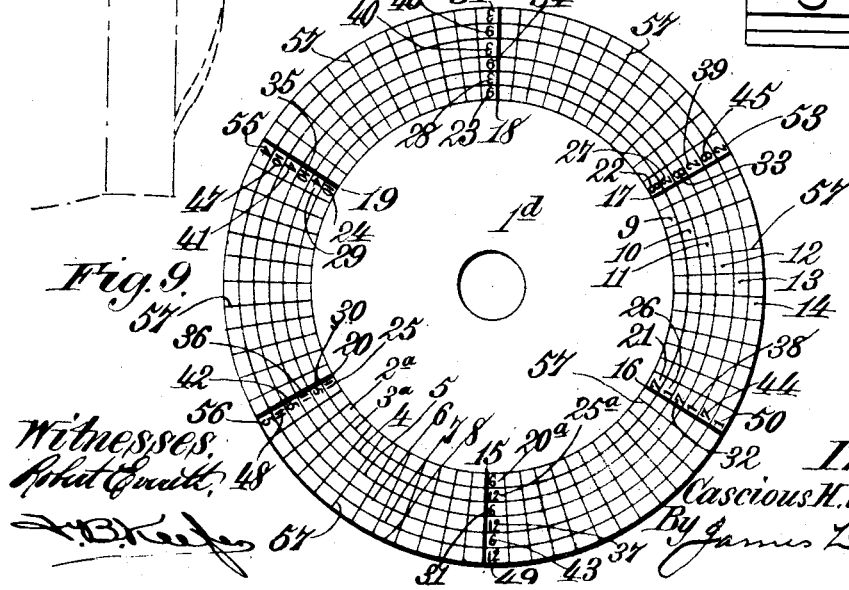

UNITED STATES PATENT OFFICE.

CASCIOUS H. D' LA MONTE, OF PHILADELPHIA, PENNSYLVANIA, ASSIGNOR, BY MESNE ASSIGNMENTS, TO INTERNATIONAL SPEED REGISTER CO., OF PHILADELPHIA, PENNSYLVANIA, A CORPORATION OF NEW YORK.

SPEED-RECORDING INSTRUMENT.

No. 872,186.     Specification of Letters Patent.     Patented Nov. 26, 1907.

Application filed March 21, 1906. Serial No. 307,235.

*To all whom it may concern:*

Be it known that I, CASCIOUS H. D' LA MONTE, a citizen of Mexico, residing at Philadelphia, in the county of Philadelphia and State of Pennsylvania, have invented new and useful Improvements in Speed-Recording Instruments, of which the following is a specification.

This invention relates to speed-recording instruments for use in connection with horse-drawn vehicles, and also for any other purpose wherein it is found applicable.

The invention further aims to provide a speed-recording instrument in a manner as hereinafter set forth which is adapted to be attached to a support, for example, the axle of a vehicle, and having the distance-recording elements thereof actuated by a rotating object, for example, a wheel of the vehicle; the distance-recording element registering upon a rotatable dial, the recording being preferably in the nature of punch-marks, and the dial being connected to and rotated by a clock mechanism and spaced or divided into subdivisions forming time-indicating spaces to receive the punch-marks, so that the time consumed between the making of any two punch-marks can be readily ascertained; all of which is very valuable as a detector to indicate the working time of a driver, and also to determine the number of miles the vehicle has traveled and the rates of speed at which it has been driven—whether fast or slow.

The invention further aims to provide a combined speed, distance and time recorder, as termed: a speed-recording instrument which shall be simple in its construction, strong, durable, non-vibratory to prevent the parts from operating in an inaccurate manner and also from getting out of adjustment, efficient in its use, accurate in its recording, of small compass, readily set up, and comparatively inexpensive to manufacture.

With the foregoing and other objects in view, the invention consists of the novel construction, combination and arrangement of parts hereinafter more specifically described, illustrated in the accompanying drawings which form a part of this specification and wherein is shown the preferred embodiment of the invention, but it is to be understood that changes, variations and modifications can be resorted to which come within the scope of the claims hereunto appended.

Figure 2:
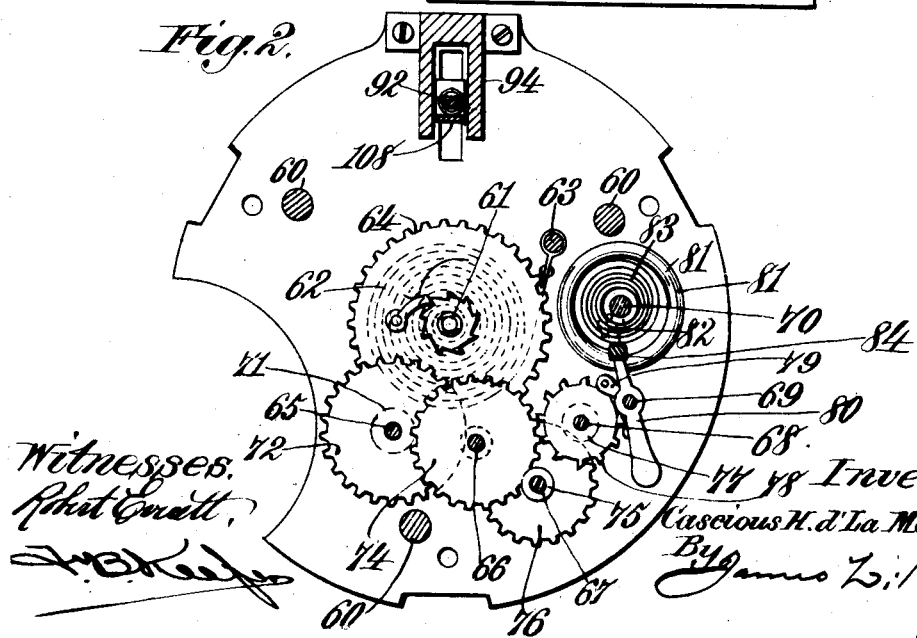

In describing the invention in detail, reference is had to the accompanying drawings, wherein like characters of reference indicate corresponding parts throughout the several views, and in which:

Figure 1 is a top plan partly broken away of a speed-recording instrument in accordance with this invention; Fig. 2 is a sectional plan showing the clock train; Fig. 3 is a transverse section; Fig. 4 is a disassembled view of the parts constituting the shifting mechanism and mechanism for the punching mechanism and also showing certain elements disassembled of a dial-supporting and retaining means; Fig. 5 is a front view of the actuating means for the operating mechanism for the dial-punching mechanism; Fig. 6 is a sectional view of a modified form of the dial-punching mechanism; Fig. 7 is a detail showing the punch of the dial-punching mechanism; Fig. 8 is a side elevation showing the instrument in operative relation with respect to the wheel of a vehicle, and Fig. 9 is a view of the dial.

For the purpose of illustration, so that the application of the invention can be understood, the speed-recording instrument is shown, by way of example, as attached to a vehicle; and referring to the drawings by reference characters, 1 denotes a casing or housing which may be of any suitable shape, but as shown is cylindrical in contour; and the said casing 1 is attached to a bracket $1^a$ by a detachably-retaining arm $1^b$. The bracket $1^a$ is provided with a supporting plate $1^c$ against which the casing 1 is placed and retained thereon by the arm $1^b$. The bracket $1^a$ is clamped to the axle 2 of the vehicle and the said casing 1 is arranged in suitable relation with respect to the wheel 3 carried by the said axle 2. The casing 1 is adapted to house the dial-punching mechanism, the operating and shifting mechanisms therefor, the actuating means for said operating mechanism, the clock mechanism for rotating the dial, the dial, a supporting and retaining means for the dial, a means to prevent vibration of or shock to the said operating, shifting and clock mechanisms and the dial, as well as other elements which constitute parts of the instrument. In addition to the elements of the instrument just referred to, the instrument further comprises means operated from the rotation of the wheel 3 for operating said actuating mechanism.

The form of dial used in connection with the instrument is that as shown and described in application Serial No. 297,620, filed January 24, 1906. The dial 1[d] consists of a piece of suitable material having printed or otherwise placed thereon, a series of concentric circles 2[a], 3[a], 4, 5, 6, 7 and 8, forming a series of circularly-arranged parallel spaces 9, 10, 11, 12, 13 and 14, each of which is divided by radially-extending lines 15, 16, 17, 18, 19 and 20, into six major divisions, each of said major divisions of each circular space being suitably designated to constitute a certain hour of the day, such hour being ante or post meridian, as the case may be. The designation for the major division of the circular space 9 are the hour indications 6, as at 20[a]; the hour indication 7 as at 21; the hour indication 8, as at 22; the hour indication 9, as at 23; the hour indication 10, as at 24; and the hour indication 11, as at 25. The designations for the major divisions of the circular space 10 are the hour indication 12, as at 25[a]; the hour indication 1, as at 26; the hour indication 2, as at 27; the hour indication 3, as at 28; the hour indication 4, as at 29; and the hour indication 5, as at 30. The designations for the major divisions of the circular space 11 are the hour indication 6, as at 31; the hour indication 7, as at 32; the hour indication 8, as at 33; the hour indication 9, as at 34; the hour indication 10, as at 35; and the hour indication 11, as at 36. The designations for the major divisions of the circular space 12 are the hour indication 12, as at 37; the hour indication 1, as at 38; the hour indication 2, as at 39; the hour indication 3, as at 40; the hour indication 4, as at 41, and the hour indication 5, as at 42. The designations for the major divisions of the circular space 13 are the hour indication 6, as at 43; the hour indication 7, as at 44; the hour indication 8, as at 45; the hour indication 9, as at 46; the hour indication 10, as at 47; and the hour indication 11, as at 48. The designation for the major divisions of the circular space 14 are the hour indication 12, as at 49; the hour indication 1, as at 50; the hour indication 2, as at 53; the hour indication 3, as at 54; the hour indication 4, as at 55; and the hour indication 5, as at 56. Each major division of each circular space is divided by a series of radially-extending lines 57 into a series of subdivisions to indicate the fraction of an hour, as shown. These subdivisions are preferably twelve in number, so that each subdivision is what may be termed a five-minute space, or the number of subdivisions can be such as will be found in practice to give sufficiently-accurate reading. The designations for indicating the hour for each major division are of such style that antemeridian and postmeridian will be indicated, and, by way of example, the designation for the major divisions to constitute antemeridian indication is printed in light type and the designation for the major divisions to constitute postmeridian indication is printed in heavy type. Other means than that which is shown for indicating ante and postmeridian may be employed, for example, by printing a tint or color over the postmeridian spaces, or to indicate in some manner a difference between the ante-meridian spaces and the postmeridian spaces.

The clock mechanism consists of a pair of movement pillar plates 58, 59 connected together by the pillar 60, the plate 58 being of much less diameter than the plate 59 and is suitably spaced therefrom through the medium of the pillars 60. Centrally of the plates 58, 59 and projecting from the plate 58, is the main staff 61 of the clock mechanism, said staff being rotatably connected to the plates 58, 59, and has secured to the lower end thereof, one end of the main clock or motion-transmitting spring 62, said spring 62 surrounding said staff and having its outer end fixed to a post 63 which is secured to the plate 58, 59. To the staff 61 is fixed the main gear 64 of the clock train. The latter beside the main gear 64, comprises auxiliary staffs 65, 66, 67, 68, 69 and 70, and upon the staff 65 is mounted a pinion 71 and a gear 72, the pinion 71 meshing with the main gear 64; upon the staff 66 is mounted a pinion 73 and a gear 74, the pinion 73 meshing with the gear 72; upon the staff 67 is mounted a pinion 75 and a gear 76, the pinion 75 meshing with the gear 74; upon the staff 68 is mounted a pinion 77 and an escape wheel 78, the pinion 77 meshing with the gear 76; upon the staff 69 is mounted an escapement 79 and a lever 80; the escapement 79 engages with the escape wheel 78; upon the staff 70 is mounted a balance wheel 81 provided with a protuberance 82 with which engages the forked end of the lever 80, and surrounding the staff 70 is a spring 83 having one end connected with said staff 70 and its other end is attached to a lug 84 depending from the lower face of the plate 58. The clock train as shown has the parts thereof set up in such relation with respect to each other and with respect to the staff 61, that the movement of the staff 61 is so regulated that it makes a complete revolution every six hours. Although the clock mechanism is designed to cause a complete revolution of the staff 61 every six hours, yet it is evident that the mechanism can be designed so that the staff will make a complete revolution at shorter or longer periods, if desired.

The supporting and retaining means for the dial consists of a circular supporting member 85 fixed to the outer face of the plate 58 at the margin thereof, and the said supporting member 85 has its outer face provided with suitable indications to constitute hours and fractions of an hour. As shown, the indications upon the outer face of the supporting member 85 constitute twelve hours and the fractions thereof in five-minute spaces; but it is evident that such indications can be changed if desired. The combined supporting and retaining means for the dial further comprises a disk 86 having a boss 87 on the lower face of less diameter. The said disk 86 is provided with a screw-threaded opening 87$^a$ which extends through the boss 87, and the screw-threads of the wall of the opening 87$^a$ are adapted to engage with the screw-threads 87$^b$ on the end of the staff 61 so that the said disk 86 will rotate with the staff 61. The said disk 86 is further provided on its upper face with a pin or stud 88 which is adapted to extend through the dial to prevent the dial from shifting when the latter is in position to be punched and when revolved by the staff 61. A binding collar 88$^a$ for the disk 86 is also provided; said collar 88$^a$ is screw-threaded, engages with the screw-threads 87$^b$ on the staff 61 and also abuts against the disk 86. The combined supporting and retaining means further comprises a clamping button 89 having its lower face formed with a groove 90 to receive the pin or stud 88. The groove 90 is continuous so that it is not necessary to position the button 89 when placing the button in its clamping position to receive the pin or stud 88. The button 89 is formed with an opening so as to surround the collar 88$^a$ and also to permit of the button being mounted upon the dial so that the dial cannot shift off the pin or stud 88. To retain the button 89 in position, it is provided with a clamping spring 91 which projects outward from the inner face of the button and frictionally engages the collar 88$^a$, thereby securely retaining the button 89 in position, which, in connection with the pin or stud 88 secures the dial to the staff 61 so that the dial will rotate with the staff 61, and complete a revolution every six hours.

The punching mechanism for the dial consists of a shiftable punch 92 having its outer end formed with a pivoted needle-point 93, so that the needle-point will form no obstacle to the movement of the dial and be prevented from tearing the dial as the said point will be caused to swing in the same direction with the direction of travel of the dial, consequently enabling the dial to move clear of the point; or in other words, owing to the pivoted end of the punch, the needle will be caused to swing clear of the dial during the movement of the latter. Said punch is shiftable towards and from the outer and inner concentric circles of the dial, the latter being positioned in the path of the needle-point. The punch 92 is arranged in a casing 94, which is fixed to the plate 59 and arranged at the edge of the plate 58. The casing 94 projects above the plate 58 and carries a pair of combs 95, 96 between which the dial extends. One of said combs is spaced from the other by a spacing member 97 and the comb 96 is spaced from the casing 94 by a spacing member 98. The comb 96 forms a support for the dial. The tines of the combs 95 and 96 constitute guides for and the spaces formed between the tines permit of the passage of the needle-point 93 when punching or perforating the dial and correspond to the circular spaces 9, 10, 11, 12, 13 and 14 of the dial. The casing 94 at its top is open so that the shifting movement of the punch 92 to and from the dial will not be interfered with, and which also enables the shifting of the punch with respect to the circular spaces 9, 10, 11, 12, 13, and 14.

In the form of dial used, it is necessary for the punch to be arranged in operative relation with respect to each of the circular spaces 9, 10, 11, 12, 13 and 14 of the dial which is divided into major divisions constituting hours. That is to say, after the dial makes a complete revolution and has certain time-indicating spaces of one circular space punched, it is necessary that the punch be positioned so that the time-indicating spaces of an adjacent circular space of the dial will be suitably punched to complete the record. To properly position the punch for the purpose set forth, a shifting mechanism is provided; and said mechanism comprises a rotatable star-wheel 99 and pinion 100, which are carried by a stud 101 suitably connected to the plate 58. The said pinion 100 is adapted to mesh with a toothed member 102 pressed against the said pinion 100 so as to be retained in mesh therewith at all times through the medium of a spring 103 carried by the plate 58. The toothed member 102 is actuated when the star-wheel 99 is shifted, and the means for shifting the star-wheel consists of an adjustable arm 104 surrounding the boss 87 and frictionally connected with the disk 86 by a frictional coupling member 103$^a$ carried on the staff 61 so as to rotate the said arm 104 with the staff 61, but the coupling 103$^a$ will permit of the said arm 104 being manually adjusted when occasion so requires. The arm at its inner end is formed with a depending lug 105 which, as the arm 104 rotates comes into engagement with one of the teeth of the star-wheel 99, thereby shifting the said star-wheel, consequently moving the member 102, the direction of movement of the member 102 being away from the staff 61. The toothed member 102 constitutes a combined stop and releasing means for a shifting plate 106 which is slidably mounted upon the outer face of the plate 58 and is formed with a series of shoulders 107, with which the member 102 engages. The plate 106 is further provided with an L-shaped arm 108 having one of its members extending into the casing 94 and engaging with the punch 92. The said member of the L-shaped arm 108 is formed with an opening for the purpose of surrounding the punch 92, so that when the plate 106 is shifted in one direction or the other, the said member will engage the punch 92 and be carried therewith. The shifting movement of the plate 106 in one direction is caused through the medium of a pulling spring 109 which is positioned at the inner side of the plate 58, and has one of its ends fixed to a lug 110 and the other of its ends fixed to a rod 111 which projects from the plate 106 and through a slot 112 formed in the plate 58. The member 102 of such length as to project to each side of the staff 91, and owing to the action of the spring 103 is held normally in engagement with the plate 106, and the distance of movement of the member 102 when shifted, is such as to move off one shoulder 107, allowing the action of the spring 109 to shift the plate 106 until the latter comes into engagement again with the member 102 which arrests the movement of the plate 106. The shoulders 107 are formed such distances apart that when the plate 106 is shifted through the action of the spring 109, the distance that the plate 106 moves is such that the needle-point 93 of the punch will be positioned below one of the spaces formed by a pair of the tines of the combs 95, 96 which correspond to a circular space of the dial. The shoulders 107 on the plate 106 correspond to the number of teeth of the star-wheel 99.

The operating mechanism for the punching mechanism consists of a toothed wheel 113 mounted for rotation within the casing 1 and carrying on its outer face a cam piece 114 which engages the lower end of the punch 92, said lower end of the punch 92 projecting down through the plate 59 and in the path of the cam-piece 114. Therefore, it will be evident that when the cam-piece 114 during the travel of the wheel 113, engages the punch 92, the latter will be shifted towards the dial and punch in one of the time-indicating spaces of the dial; and that after the lower end of the punch 92 passes off the cam-piece 114, the punch will move in the opposite direction—that is: away from the dial. The teeth of the wheel 113 correspond in number to the number of revolutions the wheel of the vehicle must take when traveling a quarter of a mile, and the said toothed wheel 113 is operated by a spring-pressed dog 115 carried by a spring-pressed arm 116 which is pivoted to the inner face of the casing 1 as at 116ª. The arm 116 also carries a roller 117 which is positioned in suitable relation with an opening 118 formed in the side of the casing, and through the said opening an actuating means for said arm 116 operates, thereby rocking the arm 116 in one direction; and owing to the engagement of the pawl 115 with the teeth of the wheel 113, the wheel 113 is given an impulse for every revolution of the vehicle wheel. The plate 59 is cut away to allow the operation of the arm 116, and the manner in which the arm 116 is operated will be presently referred to. One or more cam-pieces 114 can be provided upon the wheel 113 for operating the punch 92, so that the punch may be operated to record any desired fraction of a mile.

The means to prevent vibration or shock to certain of the mechanisms of the instrument so that there will be no interference in the accurate recording of the instrument, consists of a plurality of Z-shaped springs 119 which are fixed at one end to the plate 59 and at the other end are provided with openings 120 to permit of mounting said springs 119 upon the inwardly-extending lugs 121 carried on the inner face of the casing 1, the springs 119 consequently suspending within the casing 1 the plates 58, 59, as well as the elements carried thereby and will take up and absorb all shock from the vehicle so as not to cause any interference with the operation of the instrument.

The actuating means for the operating mechanism for the dial-punching mechanism consists of a reciprocatory, spring-return plunger 122 which is carried in a sleeve 123. The inner end of the plunger 122 operates through the opening 118, and when operating through said opening 118 engages the roller 117 and moves the same forwardly in one direction, the arm 116 carrying the dog 115 therewith, the latter engaging in the teeth of the wheel 113 and rotating it. The movement in one direction of the plunger 122, that is to say, the movement of the plunger towards the arm 116 so as to operate said arm is caused through the medium of a cam 125 carried by the hub of the wheel 3, the said cam 125 engaging a roller 126 carried on the outer end of the plunger 122. The roller 126 is arranged in the path of the cam 125 so that during the rotation of the wheel 3, the cam 125 will intermittently strike the roller 126, forcing the plunger towards the arm 116, engaging the roller 117 and shifting the arm 116 in a manner as stated. After the cam 125 has passed the roller 126, the plunger will be moved in an opposite direction, that is to say, towards the path of the cam 125 through the action of a spring 125ª which is arranged in the sleeve 123. The spring is so positioned that on the movement of the plunger 122 towards the arm 116, the spring will be compressed and when the cam 125 passes out of engagement with the roller 126, the spring will be released, consequently returning the plunger 122 to its normal position in the path of the cam 125.

It has been found advantageous in some instances to provide a means for varying the size of a punch-mark or perforation to indicate the separate miles traveled, that is to say, preferably each punch-mark represents a quarter of a mile; and when punching the last quarter of a mile, the said puncture is to be enlarged so that one can see at a glance the number of miles traveled, without going to the trouble of aggregating the total number of quarter miles, each of which being indicated by a puncture. In Fig. 6 of the drawings, a means is shown for punching for the last quarter of a mile in a manner so as to indicate that a mile has been traveled. Said means consists of a star-wheel 127 which projects below the plate 59 in the path of the cam-piece 114. The star-wheel 127 is carried by the shaft 128 mounted at one end in a bearing on the plate 59 and at its other end in the outer wall of the casing 94. The shaft 128 carries a toothed sleeve 130, one of the teeth of the sleeve 130 being of greater length than the remaining teeth. The toothed sleeve 130 is arranged below the punch 92, and the teeth of said sleeve 130 are adapted to shift the punch 92 towards the dial; and owing to the manner in which the teeth of the sleeve 130 are constructed, it will be evident that the elongated tooth will convey to the punch 92 a longer stroke than any of the shorter teeth. Consequently this longer stroke will increase the size of the perforation in the dial so a distinction is had between the perforations caused by the smaller teeth operating on the punch and the perforation caused by the longer tooth operating on the punch. The teeth of the sleeve 130 are arranged as shown so that a punch will be made in the dial every eighth of a mile, but the punch for the last eighth will be larger than the punch for the other eighths so that one can see at a glance when a mile has been traveled.

A suitable cover 131 is provided for the casing 1; and the said retaining arm 1ᵇ not only retains the casing upon the bracket 1ᵃ, but also secures the cover 131 in position. The retaining arm 1ᵇ is locked in position so that the driver cannot gain access to the interior of the instrument.

The dial when placed in position to receive the punch-marks is turned face down, but before being positioned, the arm 104 is adjusted so that it will shift the star-wheel at the proper time to adjust the punch so that the punch will perforate the dial at the proper points. This is necessary owing to the fact that a vehicle may leave a starting point at various times of the day and not at a special time.

When the vehicle is standing still, the punch and its operating mechanism are not in operation, but the time mechanism still continues to operate, moving the dial, but the period of inaction of the punching mechanism will be indicated by a lack of record on the dial so that one can readily see the period of time which the vehicle is standing still, said period of time being indicated by the spaces between the last punch-mark made before the vehicle came to a halt and the first punch-mark made after the vehicle is started.

The general operation of the instrument is as follows: It will be assumed that the dial is in position and that the vehicle begins its trip at six a. m., in the circular space 11, the clock mechanism being in operation will rotate the dial. As the vehicle travels, the toothed wheel 113 with its cam piece or cam pieces, will be caused to come into contact with the punch of the punching mechanism and cause the punching of the dial. The rotating of the vehicle wheel will throw into operation the plunger 122, the latter in turn operating the arm 116 which will cause the dog 115 to engage the teeth of the wheel 113 and impart movement to the wheel. As the clock mechanism is so constructed as to cause a complete revolution of the dial every six hours, it will be evident that the punching of the dial will be had in the circular space 11 until the expiration of the eleventh hour, or rather, until the dial is rotated to bring the time-indicating space 11.55 a. m. over the punch. At this time, the shifting mechanism for the punching mechanism will come into play and shift the punch so that it will be positioned below the circular space 12. If the vehicle should discontinue its travel, there is no cessation of the operation of the clock mechanism and the rotating of the dial, as well as no cessation of operation of the shifting mechanism for the punching mechanism; but when the vehicle discontinues its travel, the operation of the toothed wheel 113 is discontinued. At twelve m. the dial having completed its first revolution, as before stated, the punch is shifted to a position to operate upon the next circular space which is indicated by the reference character 12. This operation continues until the vehicle returns, which may be any hour desired. When the vehicle returns, the dial is removed and a new one substituted.

The dial is placed upon the instrument at any time when the vehicle is still, for example: the dial is placed on the vehicle at any time between six and twelve p. m. As the clock mechanism is operating, the dial will be revolved so that when the dial is revolved to a position so the indication for twelve midnight is in close proximity to the punch, the shifting mechanism will be thrown into operation; consequently shifting the punch to the adjacent circular space, this space indicated by the reference character 10; the dial continues to revolve at the same time the punching mechanism remaining passive owing to the fact that the vehicle is standing still; as the dial continues to revolve, the indication six a. m. in the circular space 11 will eventually be moved in close proximity to the punch; the shifting mechanism will then be thrown into operation and consequently the punch will be shifted into the circular space 11; the vehicle then begins its trip, and consequently throws into operation the punching mechanism at predetermined intervals, and the punching of the dial continues until the vehicle returns which, by way of example, will be five-forty-five p. m., as indicated in the circular space 12.

Having thus fully described my invention, what I claim as new and desire to secure by Letters Patent, is:

1. A speed recording instrument for the purpose set forth having a punching mechanism comprising a reciprocatory punch for puncturing a dial to form a record, a casing for the punch, and a plurality of combs having the outer ends thereof secured to the wall of the casing, said combs projecting inwardly, suitably spaced apart and adapted to have the dial enter between the inner ends thereof, the tines of the combs constituting guides for the punch, combined with means for actuating the punch and for intermittently varying the size of the punctures during the operation of the instrument.

2. A speed recording instrument for the purpose set forth comprising the combination with a dial punching mechanism, of a shifting mechanism therefor, comprising an automatically-slidable stepped plate connected to the punch of the punching mechanism for shifting it, a stop member shiftable from said plate for intermittently arresting the movement thereof when shifting the punch, rotatable means for intermittently shifting said member, combined with a clock mechanism for operating said means, a rotatable toothed wheel provided with a cam piece adapted to engage and intermittently operate the punch of the punching mechanism, and an intermittently operated mechanism automatically operated from a traveling body and engaging with and actuating said wheel.

3. A speed recording instrument for vehicles, comprising a casing, a clock mechanism having a dial connected therewith and rotated thereby, said dial having a plurality of circular spaces with portions within the circular spaces designated to constitute different parts of a day, a plurality of spring elements connected with the casing and to the clock mechanism for suspending the mechanism within the casing to prevent vibration thereof, means for successively punching in the circular spaces of the dial to form a record, means operated from the clock mechanism for successively shifting in the same direction the punching means from a position in operative relation with respect to the outer circular space to a position in operative relation with respect to the other circular spaces, and means for intermittently increasing the length of the stroke of the punching means during the operation thereof to increase the size of the aperture formed in the dial.

4. In a speed recording instrument for the purpose set forth, the combination with a dial punching mechanism, of means for intermittently shifting said mechanism in the same direction, said means comprising an arm rotatable from a clock mechanism and having a stud, a star wheel carrying a pinion, said wheel adapted to be engaged and shifted by said stud, a toothed stop member meshing with said pinion and adapted to be moved when the wheel is shifted, a slidable plate provided with an extension connected to the punch of the punching mechanism and having a plurality of shoulders adapted to be successively engaged by said stop member thereby limiting the movement of the plate when shifting the punch, and a spring fixed at one end to a support and at its other end connected with said plate for automatically moving the plate in one direction when the stop member is moved out of engagement with one of the shoulders of the plate.

5. A speed recording instrument for the purpose set forth comprising a punching mechanism consisting of a reciprocatory punch, a casing for the punch, and a plurality of combs carried by the outer end of the casing and having the tines thereof constituting guides for the needle point, combined with means for operating the punch.

6. A speed recording instrument for the purpose set forth comprising a punching mechanism consisting of a reciprocatory punch, a casing for the punch, and a plurality of combs carried by the outer end of the casing and having the tines thereof constituting guides for the punch.

7. A speed recording instrument for the purpose set forth comprising a punching mechanism consisting of a reciprocatory punch, a casing for the punch, and a plurality of combs carried by the outer end of the casing and having the tines thereof constituting guides for the punch, combined with means for operating the punch.

8. A speed recording instrument for the purpose set forth comprising a punching mechanism consisting of a reciprocatory punch, a casing for the punch, and a plurality of combs carried by the outer end of the casing and having the tines thereof constituting guides for the punch, combined with means for operating and for varying the duration of the operation of the punch.

9. A speed recording instrument comprising a punching mechanism, and means for shifting it, said means comprising an automatically and intermittently operable plate engaging with said mechanism, an element for intermittently arresting the movement of said plate, and a rotatable means for shifting said element in one direction to permit of the movement of the plate.

10. A speed recording instrument for the purpose set forth embodying the combination with a punching mechanism, of a shifting mechanism therefor, comprising an automatically slidable plate connected to said punching mechanism for shifting it, a stop member engaging said plate for limiting the movement thereof when shifting the punching mechanism, and means for shifting said member.

11. A speed recording instrument for the purpose set forth embodying the combination with a punching mechanism, of a shifting mechanism therefor comprising an automatically slidable plate connected to said punching mechanism for shifting it, a stop member engaging said plate for limiting the movement thereof when shifting the punching mechanism, and means for shifting said member, combined with a clock mechanism connected to said means for operating it.

12. A speed recording instrument for the purpose set forth embodying the combination with a punching mechanism, of a shifting mechanism therefor, comprising an automatically slidable plate connected to the punching mechanism for shifting it, a stop member engaging said plate for limiting the movement thereof when shifting the punching mechanism, and a rotatable means for shifting said member.

13. A speed recording instrument for the purpose set forth embodying the combination with a punching mechanism of a shifting mechanism therefor, comprising an automatically-slidable plate connected to the punching mechanism for shifting it, a stop member engaging said plate for limiting the movement thereof when shifting the punching mechanism, and a rotatable means for shifting said member, combined with a clock mechanism for operating the said rotatable means.

In testimony whereof I have hereunto set my hand in presence of two subscribing witnesses.

CASCIOUS H. D' LA MONTE.

Witnesses:
E. A. HENKLE,
WALTER H. JACKSON.